United States Patent
Agarwal et al.

(10) Patent No.: US 11,075,850 B2
(45) Date of Patent: Jul. 27, 2021

(54) LOAD BALANCING STATEFUL SESSIONS USING DNS-BASED AFFINITY

(71) Applicant: Microsoft Technology Licensing, LLC, Redmond, WA (US)

(72) Inventors: Abhishek Agarwal, Bellevue, WA (US); Mohit Garg, Redmond, WA (US); Sandeep Bansal, Redwood, WA (US); Ashish Jain, Redwood, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/708,259

(22) Filed: Dec. 9, 2019

(65) Prior Publication Data
US 2020/0403931 A1 Dec. 24, 2020

Related U.S. Application Data

(60) Provisional application No. 62/863,018, filed on Jun. 18, 2019.

(51) Int. Cl.
*H04L 12/911* (2013.01)
*H04L 9/06* (2006.01)
(Continued)

(52) U.S. Cl.
CPC .......... *H04L 47/726* (2013.01); *H04L 9/0643* (2013.01); *H04L 45/34* (2013.01);
(Continued)

(58) Field of Classification Search
CPC combination set(s) only.
See application file for complete search history.

(56) References Cited

U.S. PATENT DOCUMENTS

| 7,047,315 B1 | 5/2006 | Srivastava |
| 2008/0082696 A1* | 4/2008 | Bestler ............... G06F 9/45533 709/250 |

(Continued)

FOREIGN PATENT DOCUMENTS

EP 2401844 A2 1/2012

OTHER PUBLICATIONS

"F5 Solutions for Containers", Retrieved from: https://clouddocs.f5.com/training/community/containers/pdf/F5SolutionsforContainers.pdf, Retrieved Date: Oct. 22, 2019, 93 Pages.
(Continued)

*Primary Examiner* — El Hadji M Sall
(74) *Attorney, Agent, or Firm* — Ray Quinney & Nebeker P.C; James Bullough

(57) ABSTRACT

The present disclosure relates to systems, methods, and computer-readable media for managing routing of traffic between clients and resource instances when providing stateful services. For example, systems disclosed herein involve a load balancer that routes probe request(s) from clients to corresponding resource instances having access to stateful session data for a stateful session between the resource instance(s) and corresponding client(s). The resource instances may provide instance identifiers to the clients for use in generating subsequent session calls. In this way, systems described herein ensure that subsequent session calls are passed to the correct resource instances having access to relevant session information.

20 Claims, 6 Drawing Sheets

(51) Int. Cl.
 H04L 12/721 (2013.01)
 H04L 12/927 (2013.01)
 H04L 29/12 (2006.01)
 H04L 29/08 (2006.01)
(52) U.S. Cl.
 CPC .......... *H04L 47/781* (2013.01); *H04L 47/808* (2013.01); *H04L 61/1511* (2013.01); *H04L 67/1012* (2013.01); *H04L 67/1097* (2013.01)

(56) References Cited

U.S. PATENT DOCUMENTS

| | | | |
|---|---|---|---|
| 2015/0067027 A1 | 3/2015 | Liu | |
| 2016/0057071 A1* | 2/2016 | Parikh | G06F 9/5011 709/226 |
| 2016/0099872 A1* | 4/2016 | Kim | H04L 49/354 370/235 |
| 2016/0286597 A1* | 9/2016 | Eriksson | H04L 61/2007 |
| 2018/0288163 A1 | 10/2018 | Mao et al. | |

OTHER PUBLICATIONS

"How Elastic Load Balancing Works", Retrieved from: https://web.archive.org/web/20190718100320/https:/docs.aws.amazon.com/elasticloadbalancing/latest/userguide/how-elastic-load-balancing-works.html, Jul. 18, 2019, 8 Pages.

"HTTP(S) Load Balancing Concepts", Retrieved from: https://cloud.google.com/load-balancing/docs/https/, Retrieved Date: Oct. 22, 2019, 19 Pages.

"Load Balancing: Session Affinity", Retrieved from: https://support.cloudflare.com/hc/en-us/articles/115001771451-Load-Balancing-Session-Affinity, Oct. 12, 2019, 4 Pages.

"Session affinity", Retrieved from: https://www.ibm.com/support/knowledgecenter/en/SS9H2Y_7.7.0/com.ibm.dp.doc/lbg_sessionaffinity.html, Retrieved Date: Oct. 22, 2019, 3 Pages.

"Understanding backend services", Retrieved from: https://web.archive.org/web/20191017182954/https:/cloud.google.com/load-balancing/docs/backend-service, Oct. 17, 2019, 23 Pages.

Buck, et al., "Virtual datacenters: A network perspective", Retrieved from: https://docs.microsoft.com/en-us/azure/cloud-adoption-framework/reference/networking-vdc, Jun. 12, 2019, 32 Pages.

Pitsch, Yves, "Azure Load Balancer new distribution mode", Retrieved from: https://azure.microsoft.com/en-in/blog/azure-load-balancer-new-distribution-mode/, Oct. 30, 2014, 10 Pages.

"International Search Report and Written Opinion Issued in PCT Application No. PCT/US20/031540", dated Jul. 15, 2020, 16 Pages.

\* cited by examiner

LOAD BALANCING STATEFUL SESSIONS USING DNS-BASED AFFINITY

CROSS-REFERENCE TO RELATED APPLICATIONS

This application claims the benefit of U.S. Provisional Patent Application Ser. No. 62/863,018, filed Jun. 18, 2019, which is hereby incorporated by reference in its entirety.

BACKGROUND

A cloud computing system refers to a collection of computing devices capable of providing remote services and resources. For example, modern cloud computing infrastructures often include a collection of physical server devices organized in a hierarchical structure including computing zones, virtual local area networks (VLANs), racks, fault domains, etc. For instance, many cloud computing services are partitioned into clusters of nodes (e.g., node clusters). Cloud computing systems often make use of different types of virtual services or resources (e.g., computing containers, virtual machines) that provide remote storage and computing functionality to various clients or customers. These instances of virtual resources (or resource instances) can be hosted by server nodes on a cloud computing system. Moreover, in one or more implementations, cloud computing systems provide stateful service sessions in which a resource instance maintains session information and provides stateful services to a client associated with the stateful service session.

While cloud computing systems provide a convenient source of computing resources to clients of the cloud computing system, a number of drawbacks exist in handling service calls originating from a large number of client devices. For example, many cloud computing architectures lack scalability for a large client base and often overload computing nodes having limited traffic handling capability. In addition, while some cloud computing architectures implement load balancers to boost efficiency and scalability of resources, many clients and load balancers are unable to effectively deliver sessions calls associated with a stateful session to a specific resource instance having access to session information associated with the stateful session.

These and other problems exist in connection with processing session calls for a variety of cloud-based services.

DETAILED DESCRIPTION

Figure 1:
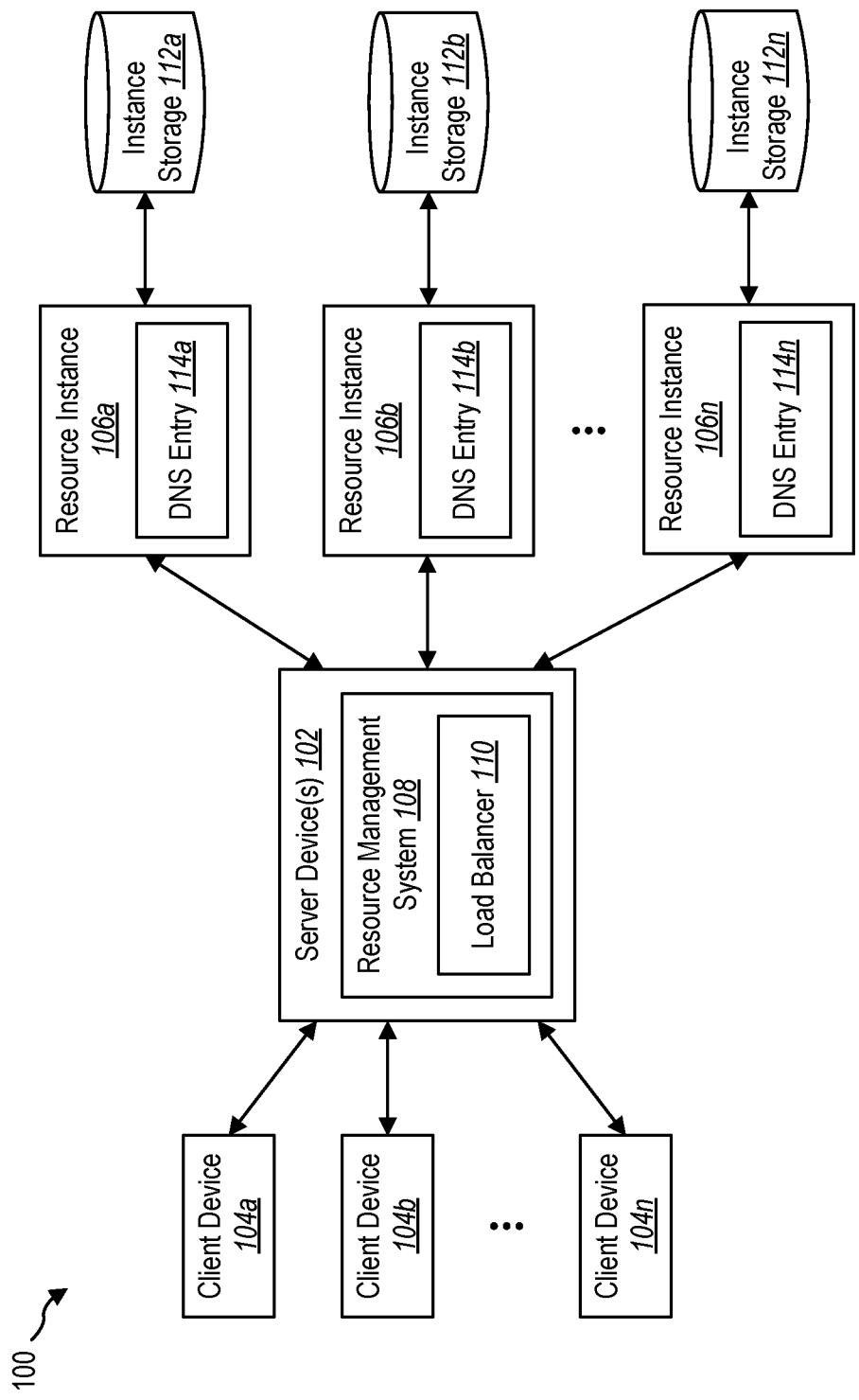
FIG. 1 illustrates an example environment including a resource management system for establishing stateful sessions between client devices and resource instances in accordance with one or more embodiments.

The present disclosure generally relates to systems, methods, and computer-readable media for managing resource instances (e.g., virtual machines, containers) on a cloud computing system and handling session calls intended for one or more of the resource instances. In particular, the present disclosure relates to an implementation of a resource management system that makes use of a load balancer (e.g., a layer 3/layer 4 (L3/L4) load balancer) to establish a stateful session between a client (e.g., a client device) and a resource instance. In addition, features and functionalities described herein facilitate communication of an instance-specific identifier (e.g., a domain name system (DNS) entry) corresponding to the resource instance that enables the client device to address one or more subsequent session calls to the resource instance having access to relevant session information.

For example, as will be discussed in more detail herein, a client device may provide a probe request to a load balancer (e.g., implemented on a resource management system) associated with a plurality of resource instances on a cloud computing system. The resource management system may utilize the load balancer to route the probe request to an available resource instance capable of handling the probe request and host a stateful session corresponding to an application or service of the cloud computing system. The selected resource instance can provide a probe response including an identifier unique to the resource instance (e.g., an instance-level DNS entry). The client device may then address one or more subsequent requests to the unique identifier to ensure that subsequent session calls are transmitted to the correct resource instance associated with the stateful session and having access to session information on a local store associated with the resource instance.

The present disclosure overcomes one or more problems associated with managing stateful sessions. For example, many conventional cloud computing systems have multiple resource instances capable of responding to service calls and providing a variety of cloud-based services (e.g., stateful services). To accommodate various performance requirements, resource instances often maintain local state information for a running service. Managing scaling and loading of these services can be challenging as a result of specific resource instances maintaining the local state information without requiring that every instance on the cloud computing environment similarly maintain or otherwise store local state information. Indeed, in many cases, clients that make a series of requests throughout the duration of a stateful service session may provide requests to different resource instances, resulting in failure to provide stateful services to the client.

Moreover, existing solutions for load balancing often fail to effectively route session requests to correct resource instances. For example, load balancing systems may implement L3/L4 load balancers as part of a product as a service (PaaS) solution. These load balancers may route traffic based on 5 tuple implementations and/or hypertext transfer protocol (HTTP) payloads, which may refer to a listing of elements such as source address, source port, destination address, destination port, and a protocol. Conventional systems, however, often do not consider HTTP payloads in determining resource instances. As a result, source ports may change from a client resulting in session requests and other network traffic landing across multiple resource instances.

As another example, some load balancing system have implemented two-tuple hashing of source address and destination address. While this may result in requests being routed to the same resource instance for a corresponding session, this solution often fails to effectively route session requests as desired. Indeed, two-tuple hashing may fail to work in various configurations and arrangements (e.g., where clients or instances are deployed in a network behind NAT).

As will be discussed in further detail below, the present disclosure includes a number of practical applications having features described herein that provide benefits and/or solve problems associated with managing cloud computing resources as well as handling session calls from clients of a cloud computing system. For example, one or more embodiments described herein enhance scalability of the cloud computing system by routing a probe request to one of any number of resource instances capable of providing a stateful service to a client. Indeed, by utilizing an L3/L4 load balancer in one or more implementations, a resource management system enables the client device to connect with one or a plurality of resource instances that is available and configured to provide a stateful service requested via the probe request.

In addition to enhancing scalability of cloud-based services, one or more embodiments described herein includes features and functionality that enable the client device to deliver subsequent session calls associated with a current stateful session to the same resource instance having access to relevant session information. For example, the resource instance may provide a service-level DNS entry that uniquely identifies the resource instance to enable the client device to address one or more subsequent calls associated with the stateful session to the same resource instance that provided the probe response. In this way, even where the L3/L4 load balancer is incapable or otherwise not configured to route subsequent session calls from clients to the same corresponding resource instances as previous calls, a client can nonetheless ensure that session calls are directly routable to the same resource instance that received an initial probe request from the load balancer.

Furthermore, by enabling a client device to pin a service-level DNS entry to a stateful session, the client device may ensure that session calls are provided to a specific resource instance even using protocols or formats in which conventional systems are unable to achieve stickiness with a particular resource instance. For example, even using an IP protocol or transmitting a call having a hypertext transfer protocol (HTTP) payload and/or where a session call utilizes a 5-tuple format, one or more embodiments described herein enable a client device to directly route session calls to the same resource instance. In this way, systems described herein can utilize an L3/L4 load balancer to effectively scale cloud resources while simultaneously enabling a client device to address subsequent requests to an instance-specific level DNS entry to ensure that session calls are provided to the relevant resource instance having access to the session information.

As mentioned above and as will be discussed in further detail below, one or more implementations described herein include a resource management system for routing requests received from a number of clients (e.g., client devices, client applications). For instance, as discussed herein, a resource management system may include load balancers positioned between a client and resource instances capable of providing a variety of services to clients of a cloud computing system. As will be discussed in further detail below, the resource management system may route probe requests from the clients to identified resource instances. The resource instances may provide a probe request including information that enables the client(s) to address subsequent requests to the corresponding resource instance having access to stateful session information. As will be discussed in further detail below, the client(s) may pin or otherwise associate information received from the resource instances such that subsequent session-based calls may be addressed to the specific resource instances.

As illustrated in the foregoing discussion and as will be discussed in further detail herein, the present disclosure utilizes a variety of terms to describe features and advantages of methods and systems described herein. For example, as used herein, a "cloud computing system" or "cloud computing network" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In addition, it will be understood that while one or more specific examples and implementations described herein relate specifically to "clusters" or "node clusters" of server nodes, features and functionality described in connection with one or more node clusters described herein can similarly relate to racks, regions of nodes, datacenters, or other hierarchical structures of physical server devices. The cloud computing system may refer to a private or public cloud computing system.

As used herein, a "resource instance" or "service instance" may refer to a virtual machine, container, or any other computing resource provided by way of one or more nodes or compute cores on a cloud computing system. In one or more implementations, a resource instance refers to an instance of a particular service or computing construct provided by way of a node, compute core, or other machine having access to information associated with one or more stateful sessions. In one or more embodiments described herein, multiple resource instances are provided by way of a single or multiple server devices (e.g., on different cores of one or multiple server node). As used herein, a stateful session may refer to a session in which a resource instance provides one or more services to a client. The resource instance may store current state session information to be used in providing features and functionality in connection with the service(s) to the client.

As used herein, a "DNS entry" may refer to an identifier of a device and/or resource of the cloud computing system. For example, a DNS entry may refer to an IP address or information that, when included within a call (e.g., a probe request, a session call), causes the call to be routed to a device or service associated with the DNS entry. To illustrate, a probe request may include a service level DNS entry assigned to a load balancer that causes the probe request to be provided to the load balancer and routed, by the load balancer, to a resource instance capable of hosting a relevant stateful service (e.g., a service indicated within the probe request). As another example, and as will be discussed further, each of a plurality of resource instances may be associated with a service-level DNS entry assigned to a corresponding resource instance. A subsequent session call including the service-level DNS entry may be routed directly to the corresponding resource instance.

Moreover, as used herein, a "stateful session" may refer to a session between a client and a resource instance in which a client device and resource instance maintain information associated with the session. Accordingly, a stateful service or stateful resource may refer to a resource provided to a client device by way of a stateful session in which a client device and computing node hosting the resource instance have access to a current state of session information.

Additional detail will now be provided regarding systems described herein in relation to illustrative figures portraying example implementations. For example, FIG. 1 illustrates an example environment 100 for implementing a resource management system including one or more load balancers in accordance with one or more embodiments described herein. For example, FIG. 1 illustrates an example environment 100 for directing network traffic in a cloud computing system. As shown in FIG. 1, the environment 100 includes a plurality of client devices 104a-n in communication with a plurality of resource instances 106a-n. The resource instances 106a-n may refer to multiple resource instances on a given device and/or cluster of devices.

Each of the client devices 104a-n may include service applications implemented thereon. For example, the client devices 104a-n may include an application such as a web browser or cloud-based application that enables the client devices 104a-n to associate a stateful session with a corresponding resource instance or further enable features and functionalities described herein. One or more applications on the client devices 104a-n may further enable the client devices 104a-n to address session calls and/or requests to a specific resource instance associated with the stateful session. In one or more embodiments described herein, the client devices 104a-n includes an application that enables the client devices 104a-n to generate and provide a probe request to the resource management system 108, as will be discussed in further detail below.

Each of the resource instances 106a-n may have access to local storages 112a-n having stateful session data or session information stored thereon. As used herein, stateful session data or session information may refer to any information associated with a current stateful session of an associated client. A resource instance may have access to stateful session data corresponding to one or multiple clients. Moreover, as mentioned above, the resource instances 106a-n may refer to virtual machines, containers, or other computing resources available via a cloud computing system and capable of servicing stateful session services in accordance with one or more embodiments described herein.

As shown in FIG. 1, the environment 100 may include one or more server device(s) 102 including a resource management system 108 thereon. The resource management system 108 may include one or more load balancers 110 capable of routing network traffic between the client devices 104a-n and corresponding resource instances 106a-n. In the example shown in FIG. 1, a load balancer 110 may refer to a variety of different types of load balancers. In one or more embodiments described herein, the load balancer 110 refers to an L3/L4 load balancer that routes traffic based on 5-tuple hashing. In one or more embodiments the load balancer 110 routes traffic (e.g., probe requests) without having access to information associated with stateful sessions between the client devices 104a-n and the resource instances 106a-n. In one or more embodiments, the server device(s) 102 includes a jump box or other computing device on which the load balancer 110 is implemented. The server device(s) 102 may be implemented on the same or different cloud computing system as the resource instances 106a-n and/or the client devices 104a-n.

As shown in FIG. 1, each of the resource instances 106a-n may be deployed behind the load balancer(s) 110. In one or more implementations described herein, a set of resource instances 106a-n are associated with a load balancer 110 such that the particular load balancer 110 routes all traffic between any number of client devices 104a-n and the set of resource instances 106a-n. The load balancer 110 may be assigned a service level DNS entry such that any traffic addressed to the service level DNS entry are routed via the load balancer 110. Moreover, each of the resource instances 106a-n may be assigned instance specific DNS entries 114a-n, which may refer to individual DNS entries 114a-n assigned to each respective resource instance 106a-n. Each resource instance 106a-n may be directly routable to a corresponding instance-specific DNS entry 114a-n.

The server device(s) 102, client devices 104a-n, and resource instances 106a-n may communicate with each other directly or indirectly through one or multiple networks. As used herein, a network may include one or multiple networks and may use one or more communication platforms or technologies suitable for transmitting data. Indeed, a network may refer to any data link that enables the transport of electronic data between devices and/or modules of the environment 100. A network may refer to a hardwired network, a wireless network or a combination of hardwired and a wireless network. A network may include the Internet. In one or more implementations described herein, the client devices 104a-n may refer to client devices that communicate with the resource management system via a network, such as the Internet while the resource management system communicates with the resource instances by way of a cloud-based network.

The client devices 104a-n (or in some embodiments, clients) may refer to client devices, client applications or any device, application, or computing construct that provides a service to an individual associated with a respective client device. For instance, a client device may refer to various types of computing devices including, by way of example, a mobile device such as a mobile telephone, a smartphone, a personal digital assistant (PDA), a tablet, or a laptop. Additionally, or alternatively, the client devices 104a-n may refer to non-mobile devices such as a desktop computer, server device, or other non-portable device. Alternatively, in one or more embodiments, a client device or client may refer to an application on a computing device or a virtual machine or other cloud computing construct implemented on the same or different cloud computing system as the resource instances 106a-n. In one or more implementations, the server device(s) and/or devices on which the resource instances 106a-n are implement may be implemented on one or more devices of a cloud computing system. Each of the devices of the environment may include features and functionality described generally below in connection with FIG. 6.

The various components of the systems described herein and illustrated in FIG. 1 can include software, hardware, or both. For example, a service application, resource management system 108, load balancer 110, and various components of the resource instances can include one or more instructions stored on a computer-readable storage medium and executable by processors of one or more computing devices (e.g., server device(s)). When executed by computer-executable instructions, the various systems and engines described herein can perform one or more methods or series of acts described herein. Alternatively, the components described herein may include hardware, such as a special purpose processing device to perform a certain function or group of functions. In addition, or as an alternative, the components may include a combination of computer-executable instructions and hardware.

Moreover, FIG. 1 illustrates an example arrangement of devices and components in accordance with one or more embodiments. For example, the resource management system 108 may include one or multiple load balancers that route traffic between one or more client devices and resource instances associated with a variety of different services. Features and functionalities of the resource management system may be implemented in whole or in part on one or multiple server device(s) that are part of a cloud computing system including a distributed network of server devices. Alternatively, features and functionality of the resource management described herein may be implemented in whole or in part of devices hosting the resource instances 106a-n or on the client devices 104a-n.

Figure 2:
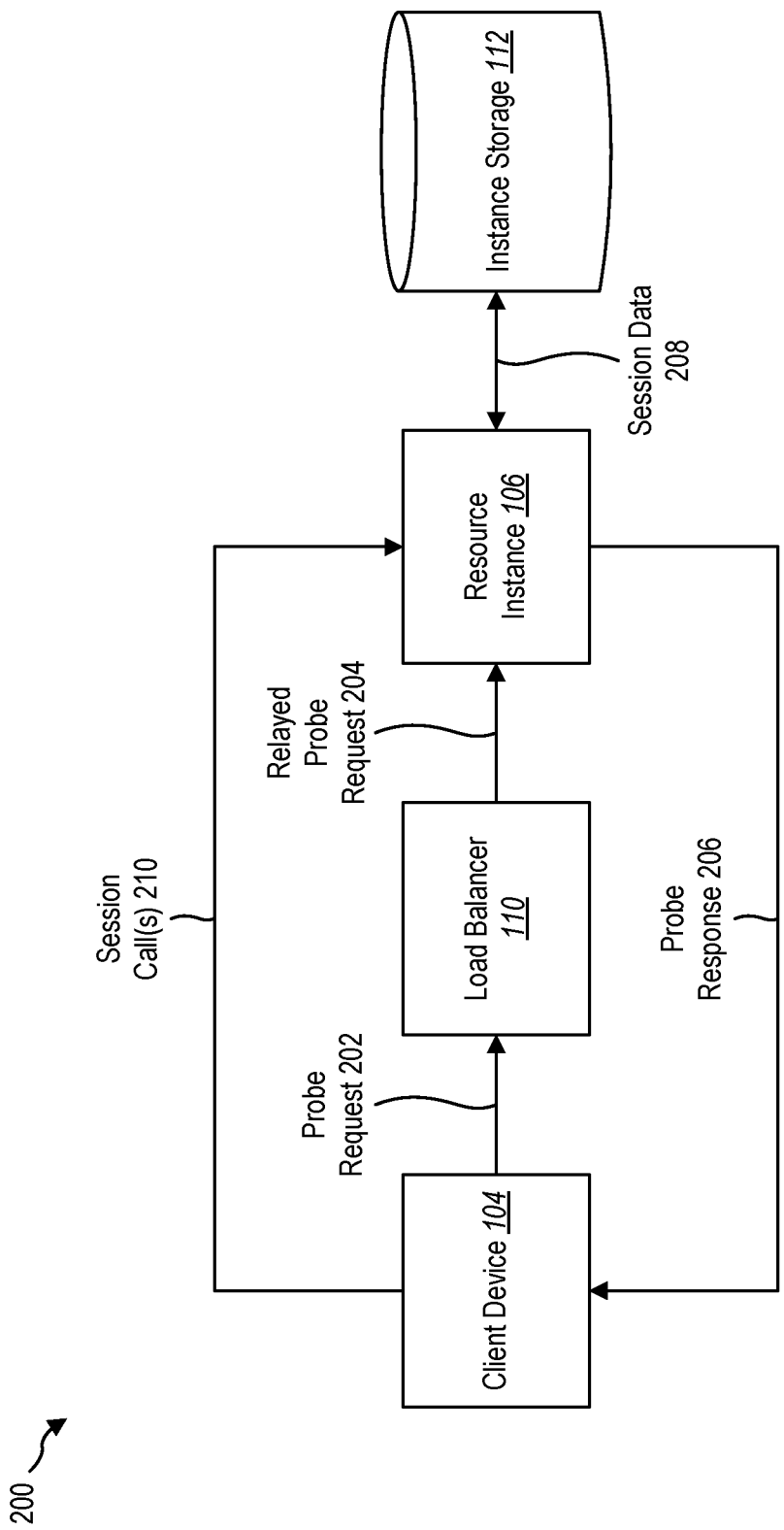
FIG. 2 illustrates an example workflow for establishing a stateful session with a resource instance in accordance with one or more embodiments.

Additional detail with regard to managing network traffic between client devices 104a-n and resource instances 106a-n will now be described in connection with FIG. 2. For example, FIG. 2 illustrates an example workflow 200 of similar components discussed above in connection with FIG. 1. In particular, FIG. 2 illustrates a workflow 200 in which a client device 104, load balancer 110, and resource instance 106 having access to an instance storage 112 facilitate establishing a stateful session between the client device 104 and the resource instance 106 in accordance with one or more embodiments described herein.

In particular, as shown in FIG. 2, the client device 104 provides a probe request 202 to the load balancer 110. For example, the client device 104 may provide a probe request 202 including a request to initiate a stateful session that lands on the load balancer 110 The initial probe request 202 may be deployed over a service level DNS entry assigned to or otherwise associated with the load balancer 110 causing the probe request 202 addressed to the service level DNS entry to be provided to the load balancer 110.

Upon receiving the probe request 202, the load balancer may provide a relayed probe request 204 to the resource instance 106. The load balancer 110 may route the relayed probe request 204 in accordance with a variety of criteria. For example, the load balancer 110 may route the relayed probe request 204 to one of a set of resource instances known to have resource availability or that are configured to handle a particular service indicated by the probe request 202. In one or more implementations, the load balancer 110 routes probe requests to one or more resource instances that have been newly added as resource instances available to receive network traffic, respond to session requests, or otherwise provide stateful services to one or more requesting clients.

In one or more embodiments the load balancer 110 routes the relayed probe request 204 to a specific resource instance 106 from a plurality of resource instances configured to receive the relayed probe request 204 or otherwise provide a service indicated by the probe request 202. For example, as mentioned above, and as will be discussed further below, each of a plurality of resource instances may be assigned an instance-specific DNS entry associated with the service level DNS entry assigned to the load balancer 110. In this way, the load balancer 110 can select the resource instance 106 determined to be available or otherwise capable of providing service to the client device 104 in response to the relayed probe request 204.

Upon receiving the relayed probe request 204, the resource instance 106 may establish a stateful session and store or otherwise access stateful session data 208 on the instance storage 112 (e.g., a local storage to the resource instance 106) to include session data 208 for a stateful session between the client device 104 and resource instance 106. In one or more implementations, the resource instance 106 that receives a probe request generates or otherwise obtains session data 208, including metadata for the stateful session and/or the resource instance 106.

As shown in FIG. 2, the resource instance 106 may generate a probe response 206 including information associated with the resource instance 106 and/or stateful session (e.g., session data 208). For example, the resource instance may generate a probe response 206 including a resource instance identifier. The resource instance identifier may include an instance specific DNS entry previously assigned to the resource instance 106. The probe response 206 may further include session data 208 as well as metadata details about the session and/or resource instance 106. As shown in FIG. 2, the resource instance 106 can provide the probe response 206 to the client device 104 including some or all of the information discussed above.

Upon receiving the probe response 206, the client device 104 may associate the data contained within the probe response 206 with a stateful session between the client device 104 and the resource instance 106. For example, the client device 104 may pin or otherwise associate a resource instance identifier (e.g., an instance-specific DNS entry) with the stateful session for use in providing future session calls 210 to the cloud computing system.

As shown in FIG. 2, the client device 104 may provide subsequent session calls 210 directly to the resource instance 106. For example, the client device 104 may address subsequent session calls 210 to the instance-specific DNS entry. By addressing subsequent session calls to the instance-specific DNS entry or otherwise including the resource instance identifier in conjunction with providing the session call(s) 210 to the cloud computing system, the client device 104 may communicate directly with the correct resource instance 106 having access to session data 208 associated with the stateful session between the client device 104 and the resource instance 106.

In one or more embodiments, the resource instance 106 may fail to adequately provide services in response to session calls 210. For example, in one or more implementations, the resource instance 106 may go down, become disconnected, or otherwise experience failure. In such a case, the client device 104 may provide a new call (e.g., a new probe request) to the load balancer 110 (or other load balancer of the resource management system 108), which relays the new call to an additional resource instance associated with the load balancer 110. For example, the load balancer 110 may identify another resource instance from a plurality of resource instances assigned to a different service-level DNS entry from the resource instance 106 that has failed and route the new call to the identified additional resource instance. Based on the shared association with the load balancer 110, the additional resource instance may be configured to provide the same or similar service as the failed resource instance 106.

The additional resource instance may collect or otherwise obtain stateful session information to enable the additional resource instance to provide services based on current session information. Similar to one or more embodiments described above, the additional resource instance may provide a probe response including an updated address (e.g., an updated instance-specific DNS entry) or other resource instance identifier associated with the additional resource instance. Where possible, the additional resource instance may recover session data for the previously established session with the resource instance 106. Alternatively, in one or more embodiments, the client device 104 simply begins a new stateful session with the additional resource instance.

In one or more embodiments, the resource management system 108 facilitates selection of the new resource instance based on various criteria. For example, in one or more implementations, a new resource instance is added to a set of resource instances assigned to the load balancer 110 after the stateful session has been established between the client and corresponding resource instance. In this case, the load balancer 110 may receive and/or execute instructions that route future traffic (e.g., new probe requests or additional probe requests provided in response to failure of resource instances) to the new resource instance(s). This provides a conveniently scalable mechanism to establish new sessions for client devices that provide new probe requests without overloading computing nodes already hosting one or more stateful sessions.

One or more embodiments described herein accomplish benefits associated with ensuring that session calls are directed to the correct resource instance(s). For example, by pinning resource identifiers with corresponding stateful session information, a cloud computing system may achieve higher availability for stateful services than conventional systems. Moreover, the cloud computing system may have higher tolerance for resource instances that go down as a client may restart a probe request to establish communication with a new resource instance capable of building a session state and catering to specific session calls. Moreover, in heavy traffic situations, adding new resource instances in this way may enable new sessions from the client to get load balanced to a new resource instance capable of handling sessions calls.

Figure 3A:
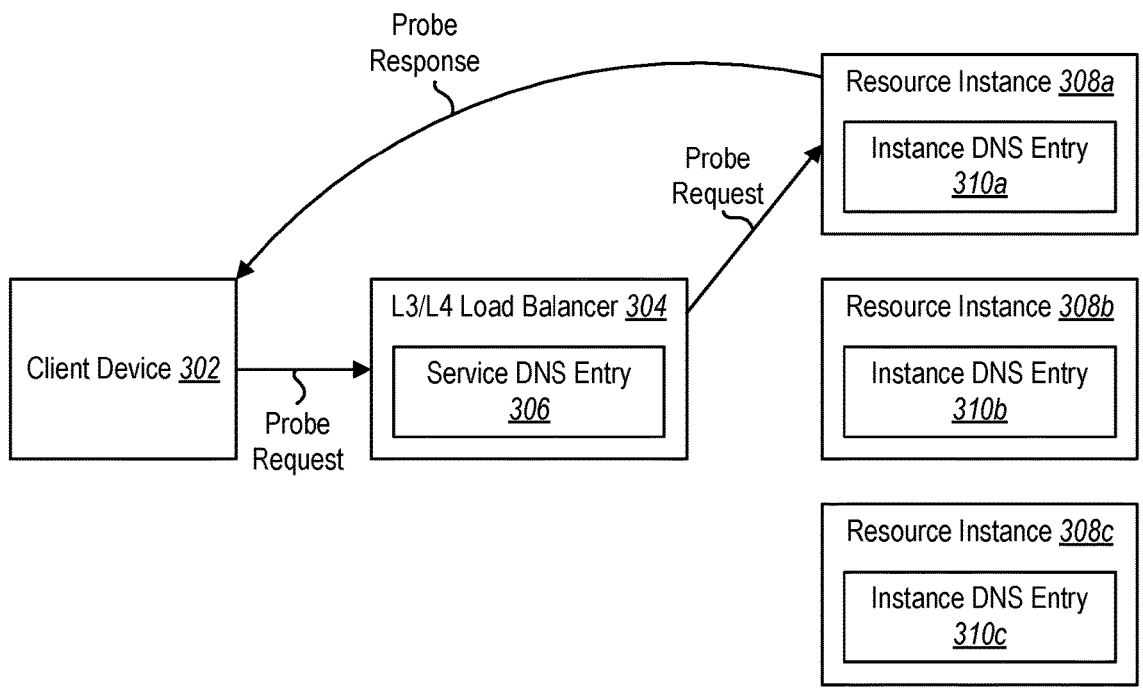
FIG. 3A illustrates an example implementation initiating a stateful session with an identified resource instance in accordance with one or more embodiments.
Figure 3B:
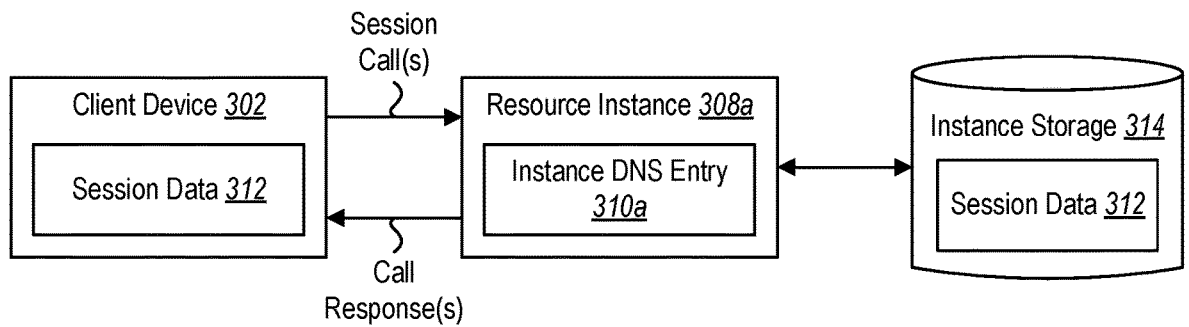
FIG. 3B illustrates an example implementation for implementing the established stateful session from FIG. 3A in accordance with one or more embodiments.

FIGS. 3A-3B illustrate another example workflow associated with routing a probe request to a resource instance via a load balancer and establishing a stateful session between a client device and a resource instance. In particular, FIG. 3A illustrates an example workflow involving a client device 302, L3/L4 load balancer 304 and a plurality of resource instances 308a-c in accordance with one or more embodiments described herein.

As shown in FIG. 3A and similar to one or more implementations discussed above, the client device 302 may transmit or otherwise provide a probe request to the L3/L4 load balancer 304 positioned between the client device 302 and the resource instances 308a-c. The L3/L4 load balancer 304 may be assigned a service DNS entry 306 that enables a probe request addressed to the service DNS entry 306 to land on the L3/L4 load balancer 304. In one or more embodiments, the service DNS entry 306 includes an IP address or uniform resource locator (URL) mapped to the L3/L4 load balancer 304.

As shown in FIG. 3A, the L3/L4 load balancer 304 may identify a first resource instance 308a as available to receive the probe request. Based on the determination of availability (or other criteria used to select the resource instance 308a), the L3/L4 load balancer 304 can provide the probe request to the first resource instance 308a. The probe request may include an identifier of the client device 302 to enable the resource instance 308a to deliver a probe response to the client device 302.

In response to receiving the probe request, the first resource instance 308a may generate a probe response to deliver to the client device 302. In accordance with one or more embodiments discussed above, the probe response may include information associated with a session as well as an identifier of the resource instance 308a. In this example, the probe response may include an identifier of an instance DNS entry 310a associated with the first resource instance 308a. Similar to the service DNS entry 306, the instance DNS entry 310a may include an IP address or URL mapped to the corresponding resource instance 308a. The instance DNS entry 310a may be an extension or have a similar URL to the service DNS entry 308.

As shown in FIG. 3A, each of the resource instances 308a-c may be assigned or otherwise associated with an instance DNS entry 310a-c. Each of the instance DNS entries 310a-c may be associated with the service DNS entry 306 assigned to the L3/L4 load balancer 304. In response to receiving a probe request, the corresponding resource instances 308a-n may provide a probe response including an identifier of a corresponding instance DNS entry 310a-n.

As shown in FIG. 3B, the client device 302 and resource instance 308a can establish a stateful session between the respective devices/services. For example, as shown in FIG. 3B, the client device 302 can store session data 312 on a local storage of the client device 302. In addition, the resource instance 308a can access corresponding session data 312 on an instance storage 314 accessible to the resource instance 308a. The instance storage 314 may be implemented as part of the same computing node on which the resource instance 308a is hosted. Alternatively, the instance storage 314 may be accessible on a different device as the computing node on which the resource instance 308a is hosted.

As shown in FIG. 3B, the client device 302 may provide subsequent session calls for the stateful session to the resource instance 308a. In response, the resource instance 308a can provide call responses to the client device 302 for as long as the stateful session persists or until the resource instance 308a goes down or is disconnected. As mentioned above, the client device 302 may begin a new session by generating and transmitting a new probe request to the L3/L4 load balancer 304 to initiate and establish a new stateful session with one of the resource instances 308a-c in accordance with one or more embodiments described herein.

Figure 4:
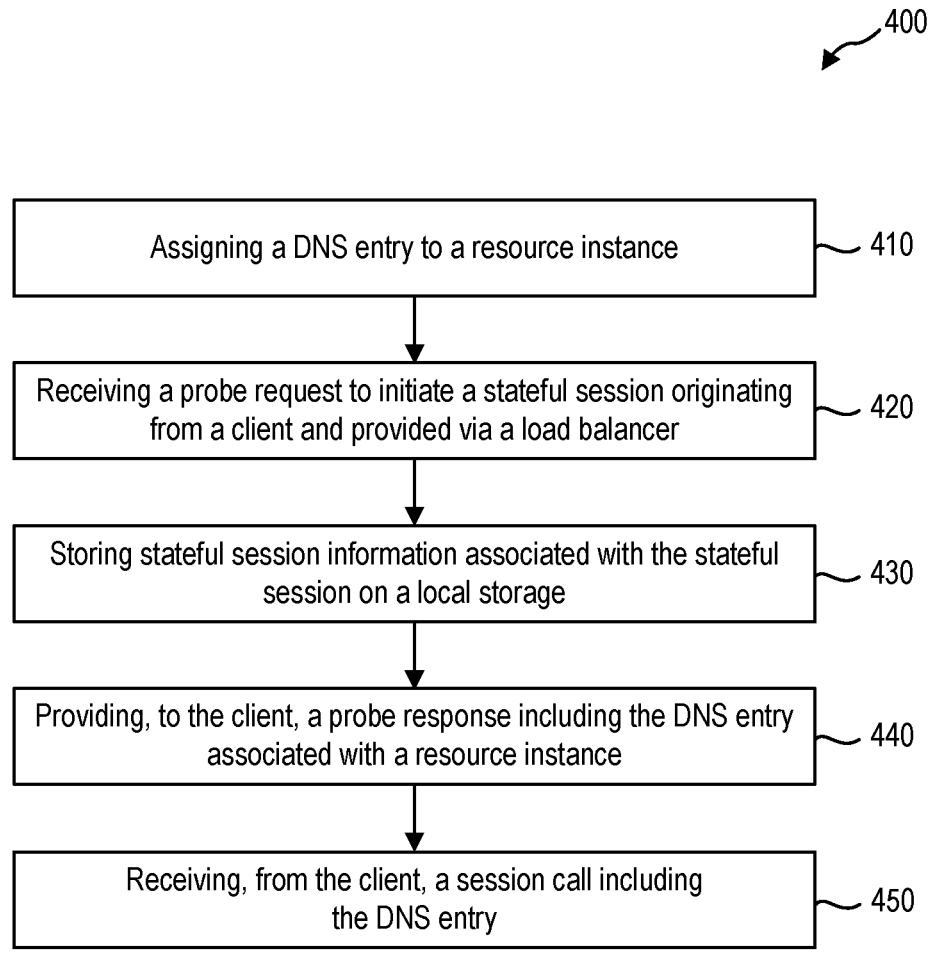
FIG. 4 illustrates an example series of acts for establishing a stateful session between a client device and a resource instance in accordance with one or more embodiments.
Figure 5:
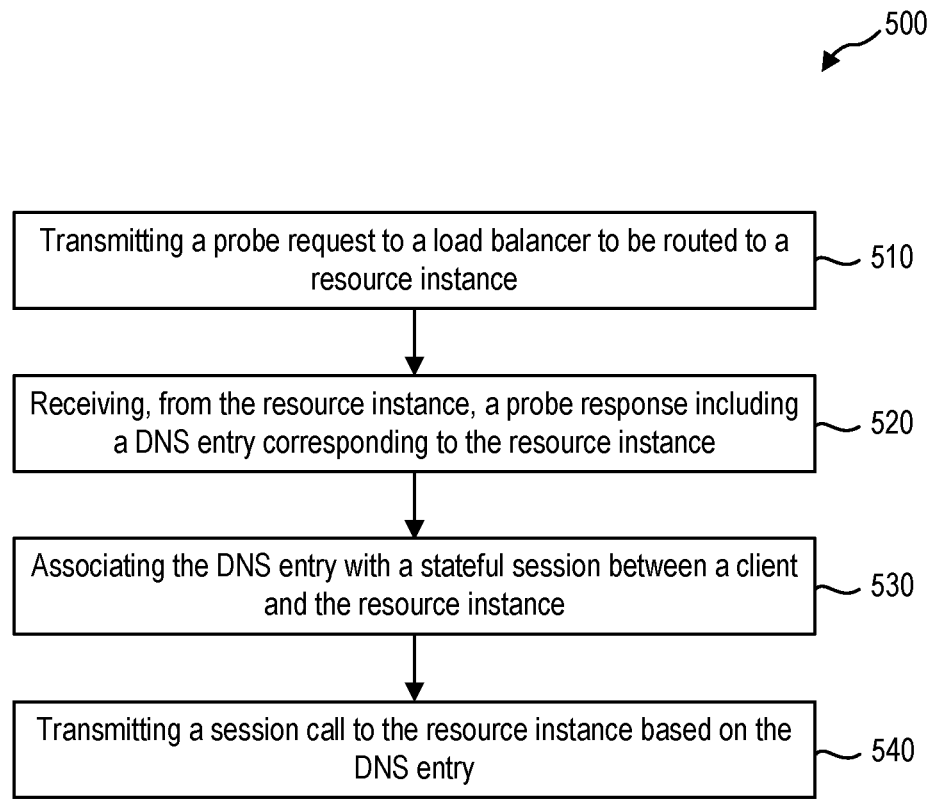
FIG. 5 illustrates another example series of acts for establishing a stateful session between a client device and a resource instance in accordance with one or more embodiments.

Turning now to FIGS. 4-5, these figures illustrates example flowcharts including series of acts for implementing features and functionalities described herein. While FIGS. 4-5 illustrate acts according to one or more embodiments, alternative embodiments may omit, add to reorder, and/or modify any of the acts shown in FIGS. 4-5. The acts of FIGS. 4-5 may be performed as part of a method. Alternatively, a non-transitory computer-readable medium can include instructions thereon that, when executed by one or more processors, cause a server device and/or client device to perform the acts of FIGS. 4-5. In still further embodiments, a system can perform the acts of FIGS. 4-5.

FIG. 4 illustrates a series of acts 400 for routing a probe request to a resource instance via a load balancer and establishing a stateful session based on a DNS entry associated with the resource instance. In one or more implementations, the series of acts 400 is performed by one or more server devices on a cloud computing system. As shown in FIG. 4, the series of acts 400 includes an act 410 of assigning a DNS entry to a resource instance. For example, in one or more embodiments, the act 410 involves associating an instance-specific domain name system (DNS) entry to a resource instance on a cloud computing system.

As further shown, the series of acts 400 includes an act 420 of receiving a probe request to initiate a stateful session originating from a client and provided via a load balancer. For example, in one or more embodiments, the act 420 involves receiving, at the resource instance, a probe request originating from a client of the cloud computing system and provided via a load balancer where the probe request includes a request to initiate a stateful session with the resource instance.

As further shown, the series of acts 400 includes an act 430 of storing stateful session information associated with the stateful session on a local storage. For example, in one or more embodiments, the act 430 includes storing stateful session information associated with the stateful session on a local storage accessible to the resource instance.

As further shown, the series of acts 400 includes an act 440 of providing, to the client, a probe response including the DNS entry associated with the resource instance. For example, in one or more embodiments, the act 440 involves providing, to the client, a probe response including the instance-specific DNS entry associated with the resource instance.

As further shown, the series of acts 400 includes an act 450 of receiving, from the client a session call including the DNS entry. For example, in one or more embodiments, the act 450 involves receiving one or more session calls from the client where each of the one or more session calls are addressed to the instance-specific DNS entry without being routed via the load balancer.

In one or more embodiments, the resource instance includes a virtual machine, a container, or other computing construct deployed on the cloud computing system. In one or more embodiments, the load balancer is associated with a plurality of resource instances where the resource instance is selected from the plurality of resource instances based on a routing algorithm employed by the load balancer. For example, in one or more embodiments, the load balancer is an L3/L4 load balancer configured to route calls received from a plurality of client devices to a given resource instance from the plurality of resource instances in accordance with the routing algorithm. For example, the L3/L4 load balancer may route probe requests based on availability of computing resources of the resource instances. In one or more implementations, the load balancer routes calls based on 5-tuple hashing protocol including identifiers for a source address, a source port, a destination address, a destination port, and a protocol.

In one or more embodiments, the resource instance is associated with a service DNS entry assigned to the load balancer. In one or more implementations, the resource instance is selected from a plurality of resource instances associated with the load balancer where each resource instance from the plurality of resource instances is associated with a unique instance-specific DNS entry. In one or more embodiments, the probe response additionally includes metadata associated with the stateful session to enable the client to locally pin the stateful session to the resource instance.

Moving on, FIG. 5 illustrates another series of acts 500 that involves routing a probe request to a resource instance via a load balancer and establishing a stateful session based on a DNS associated with the resource instance. In one or more implementations, the series of acts 500 is performed by a client device requesting access to the resource instance. For example, as shown in FIG. 5, the series of acts 500 includes an act 510 of transmitting a probe request to a load balancer to be routed to a resource instance. For example, in one or more embodiments, the act 510 involves transmitting, from a client device, a probe request to a load balancer to be routed to a resource instance from a plurality of resource instances associated with the load balancer.

As further shown, the series of acts 500 includes an act 520 of receiving, from the resource instance, a probe response including a DNS entry corresponding to the resource instance. For example, in one or more embodiments, the act 520 involves receiving, from the resource instance, a probe response, wherein the probe response includes an instance-specific domain name system (DNS) entry assigned to the resource instance.

As further shown, the series of acts 500 includes an act 530 of associating the DNS entry with a stateful session between a client and the resource instance. For example, in one or more embodiments, the act 530 involves associating the instance-specific DNS entry assigned to the resource instance with a stateful session between the client device and the resource instance.

As further shown, the series of acts 500 includes an act 540 of transmitting a session call to the resource instance based on the DNS entry. For example, in one or more embodiments, the act 540 involves transmitting one or more session calls to the resource instance associated with the instance-specific DNS entry without providing the one or more session calls to the load balancer.

In one or more embodiments, the resource instance is associated with a service DNS entry assigned to the load balancer. For example, transmitting the probe request may include addressing the probe request to an IP address (e.g., a service-level DNS entry) associated with the load balancer. In addition, transmitting the one or more session calls to the resource instance may include addressing the one or more session calls to the instance-specific DNS entry associated with the resource instance.

In one or more embodiments, the series of acts 500 involves associating the instance-specific DNS entry with the stateful session by pinning the instance-specific DNS entry to the stateful session on a local storage of the client device. Further, in one or more embodiments, the series of acts 500 includes determining that the resource instance has failed. In response to determining that the resource instance has failed, the series of acts 500 may include transmitting an additional probe request to the load balancer to be routed to an additional resource instance from the plurality of resource instances. The series of acts 500 may further include receiving, from the additional resource instance, an additional probe response where the additional probe response includes an additional instance-specific DNS entry corresponding to the additional resource instance for initiating a new stateful session.

Figure 6:
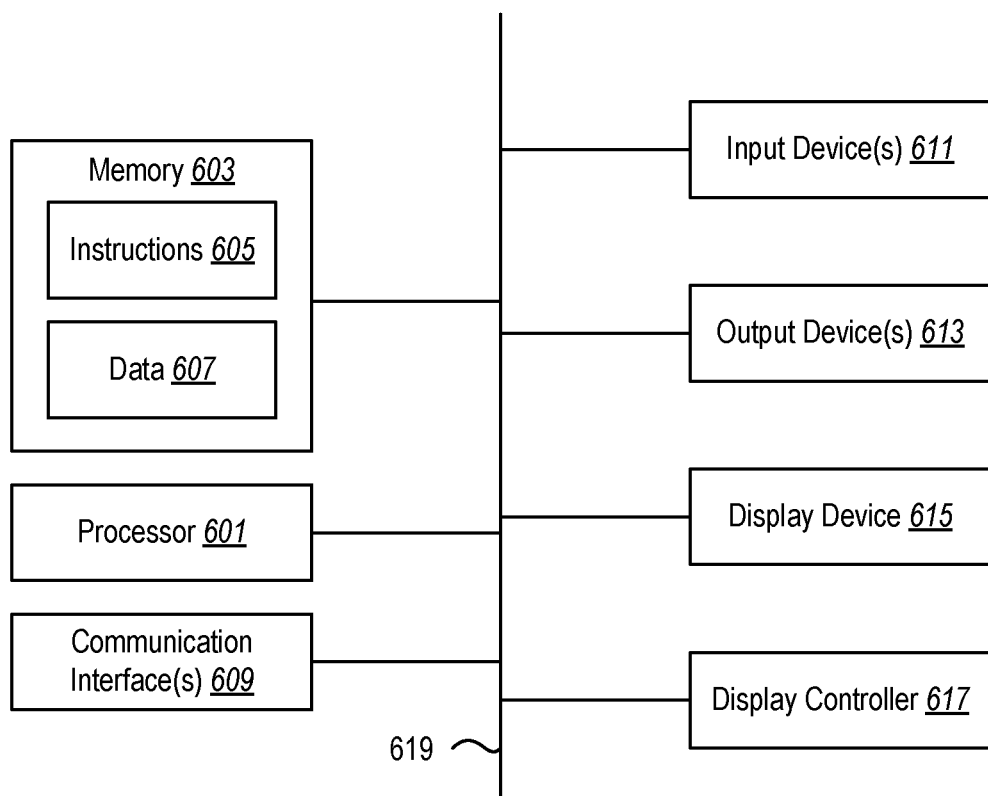
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   associating an instance-specific domain name system (DNS) entry to a resource instance on a cloud computing system;
   receiving, at the resource instance, a probe request originating from a client of the cloud computing system and provided to the resource instance via an L3/L4 load balancer, the probe request including a request to initiate a stateful session with the resource instance;
   storing, by the resource instance, stateful session information associated with the stateful session on a local storage accessible to the resource instance;
   providing, to the client from the resource instance and responsive to the probe request, a probe response including the instance-specific DNS entry associated with the resource instance; and
   receiving, at the resource instance, one or more session calls from the client, wherein each of the one or more session calls are addressed to the instance-specific DNS entry without being routed via the L3/L4 load balancer.

2. The method of claim 1, wherein the resource instance includes a virtual machine or a container deployed on the cloud computing system.

3. The method of claim 1, wherein the L3/L4 load balancer is associated with a plurality of resource instances, and wherein the resource instance is selected from the plurality of resource instances based on a routing algorithm employed by the L3/L4 load balancer.

4. The method of claim 3, wherein the L3/L4 load balancer is configured to route calls received from a plurality of client devices to a given resource instance from the plurality of resource instances in accordance with the routing algorithm.

5. The method of claim 4, wherein the L3/L4 load balancer routes calls based on 5-tuple hashing protocol including identifiers for a source address, a source port, a destination address, a destination port, and a protocol.

6. The method of claim 1, wherein the resource instance is associated with a service DNS entry assigned to the L3/L4 load balancer.

7. The method of claim 6, wherein the resource instance is selected from a plurality of resource instances associated with the L3/L4 load balancer, and wherein each resource instance from the plurality of resource instances is associated with a unique instance-specific DNS entry.

8. The method of claim 1, wherein the probe response additionally includes metadata associated with the stateful session to enable the client to locally pin the stateful session to the resource instance.

9. A method, comprising:
transmitting, from a client device, a probe request to an L3/L4 load balancer to be routed to a resource instance from a plurality of resource instances associated with the L3/L4 load balancer;
receiving, at the client device from the resource instance and responsive to the probe request, a probe response, wherein the probe response includes an instance-specific domain name system (DNS) entry assigned to the resource instance that received the probe request;
associating, by the client device, the instance-specific DNS entry assigned to the resource instance with a stateful session between the client device and the resource instance; and
transmitting, by the client device, one or more session calls to the resource instance associated with the instance-specific DNS entry without providing the one or more session calls to the L3/L4 load balancer.

10. The method of claim 9, wherein the resource instance includes a virtual machine or a container deployed on a computing node on a cloud computing system.

11. The method of claim 9, wherein the L3/L4 load balancer is configured to route calls received from a plurality of client devices to a given resource instance from the plurality of resource instances in accordance with a routing algorithm, and wherein the resource instance is selected by the L3/L4 load balancer based on an availability of computing resources of the resource instance.

12. The method of claim 9, wherein the resource instance is associated with a service DNS entry assigned to the load balancer.

13. The method of claim 12, wherein each resource instance from the plurality of resource instances is associated with a unique instance-specific DNS entry.

14. The method of claim 12,
wherein transmitting the probe request comprises addressing the probe request to an internet protocol (IP) address associated with the L3/L4 load balancer; and
wherein transmitting the one or more session calls to the resource instance comprises addressing the one or more session calls to the instance-specific DNS entry associated with the resource instance.

15. The method of claim 9, wherein associating the instance-specific DNS entry with the stateful session comprises pinning the instance-specific DNS entry to the stateful session on a local storage of the client device.

16. The method of claim 9, further comprising:
determining that the resource instance has failed;
in response to determining that the resource instance has failed, transmitting an additional probe request to the L3/L4 load balancer to be routed to an additional resource instance from the plurality of resource instances; and
receiving, from the additional resource instance, an additional probe response, wherein the additional probe response includes an additional instance-specific DNS entry corresponding to the additional resource instance for initiating a new stateful session.

17. A system, comprising:
one or more processors;
a memory in electronic communication with the one or more processors; and
instructions stored in the memory, the instructions being executable by the one or more processors to:
associate an instance-specific domain name system (DNS) entry to a resource instance on a cloud computing system;
receive, at the resource instance, a probe request originating from a client of the cloud computing system and provided to the resource instance via an L3/L4 load balancer, the probe request including a request to initiate a stateful session with the resource instance;
store, by the resource instance, stateful session information associated with the stateful session on a local storage accessible to the resource instance;
provide, to the client from the resource instance and responsive to the probe request, a probe response including the instance-specific DNS entry associated with the resource instance; and
receive, at the resource instance, one or more session calls from the client, wherein each of the one or more session calls are addressed to the instance-specific DNS entry without being routed via the L3/L4 load balancer.

18. The system of claim 17, wherein the L3/L4 load balancer is associated with a plurality of resource instances, and wherein the L3/L4 load balancer selects the resource instance from the plurality of resources instances in accordance with a routing algorithm.

19. The system of claim 18, wherein the L3/L4 load balancer routes calls based on 5-tuple hashing protocol including identifiers for a source address, a source port, a destination address, a destination port, and a protocol.

20. The system of claim 17, wherein each resource instance of the plurality of resource instances is associated with a unique instance-specific DNS entry, and wherein the one or more session calls from the client are addressed to the resource instance via the instance-specific DNS entry corresponding to the resource instance.

\* \* \* \* \*